United States Patent [19]
Stoufflet

[11] 3,917,016
[45] Nov. 4, 1975

[54] VEHICLE, SIMILAR IN TYPE TO A TRACTOR, COMPRISING A RIGID ASSEMBLY

[75] Inventor: René G. Stoufflet, Senlis, France

[73] Assignee: Poclain, Le Plessis Belleville, France

[22] Filed: May 13, 1974

[21] Appl. No.: 469,684

[30] Foreign Application Priority Data
May 23, 1973 France .............................. 73.18743

[52] U.S. Cl. ................ 180/57; 37/117.5; 180/64 R; 214/138 R
[51] Int. Cl.² ............................................ B60K 7/00
[58] Field of Search ..... 180/57, 56, 55, 54 D, 54 R, 180/64 R, 54 E; 37/117.5, 103, 80 R; 214/138 R; 267/21 R, 15 R; 280/104.5

[56] References Cited
UNITED STATES PATENTS

| | | | |
|---|---|---|---|
| 1,810,879 | 6/1931 | Uebelmesser et al. ................ | 180/57 |
| 2,275,050 | 3/1942 | Lewis .................................... | 180/57 |
| 2,785,764 | 3/1957 | Barenyi ................................. | 180/57 |
| 2,965,185 | 12/1960 | Marchetti ............................. | 180/55 |
| 3,034,587 | 5/1962 | Dorkins et al. ................. | 214/138 R |
| 3,220,746 | 11/1965 | Francis ................................. | 267/21 |
| 3,311,183 | 3/1967 | Phillips ............................ | 180/54 D |
| 3,669,467 | 6/1972 | Dunlap et al. ..................... | 267/21 R |
| 3,778,111 | 12/1973 | Ciofani ............................. | 37/117.5 |

FOREIGN PATENTS OR APPLICATIONS

| | | | |
|---|---|---|---|
| 220,962 | 1962 | Austria .............................. | 180/64 R |

*Primary Examiner*—Kenneth H. Betts
*Assistant Examiner*—David M. Mitchell
*Attorney, Agent, or Firm*—Mason, Fenwick & Lawrence

[57] ABSTRACT

The invention relates to a self-propelled vehicle comprising a chassis, ground engaging driving units, a rigid assembly comprising an engine, a driven axle to which the driving units are attached, a transmission case connecting the engine to the driven axle, resilient suspension units and at least one link attaching the chassis to the rigid assembly to filter out impacts and vibrations between the chassis and the assembly.

6 Claims, 2 Drawing Figures

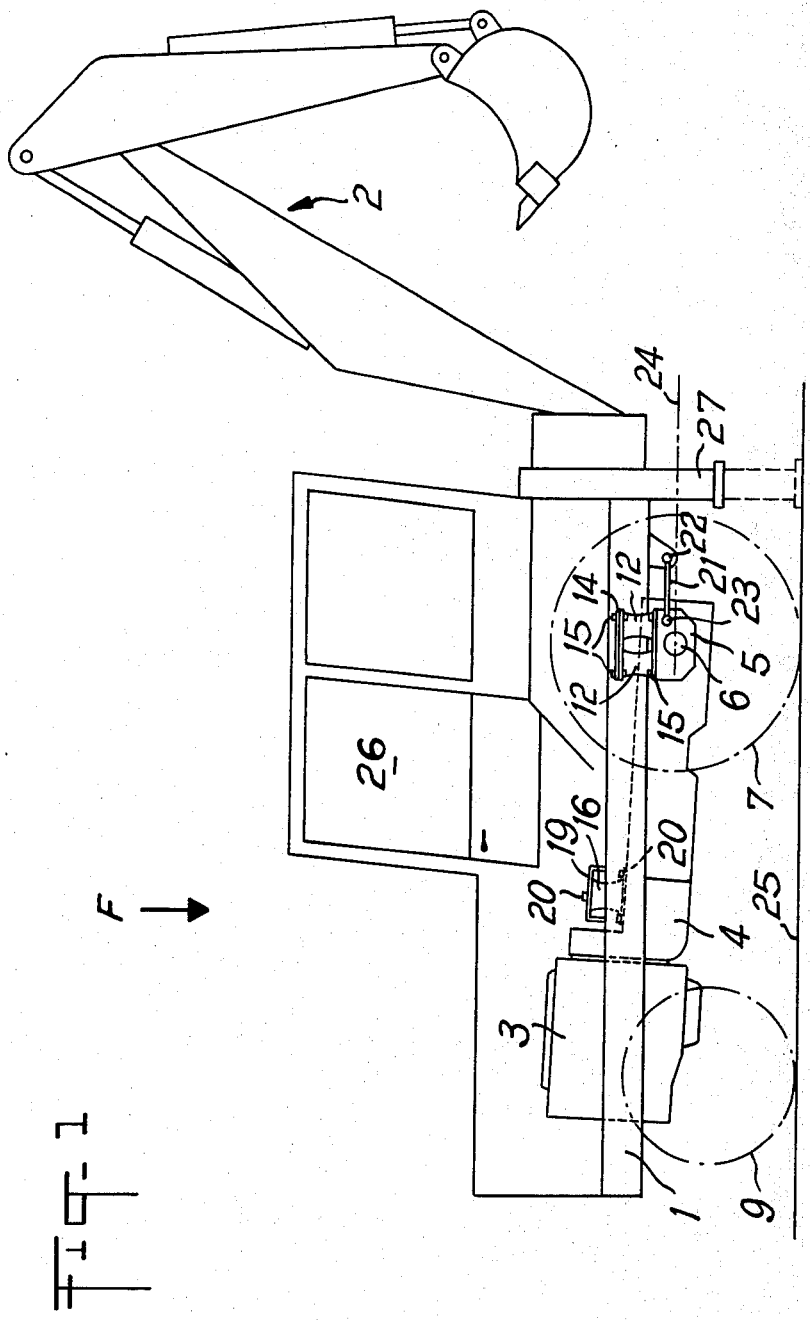

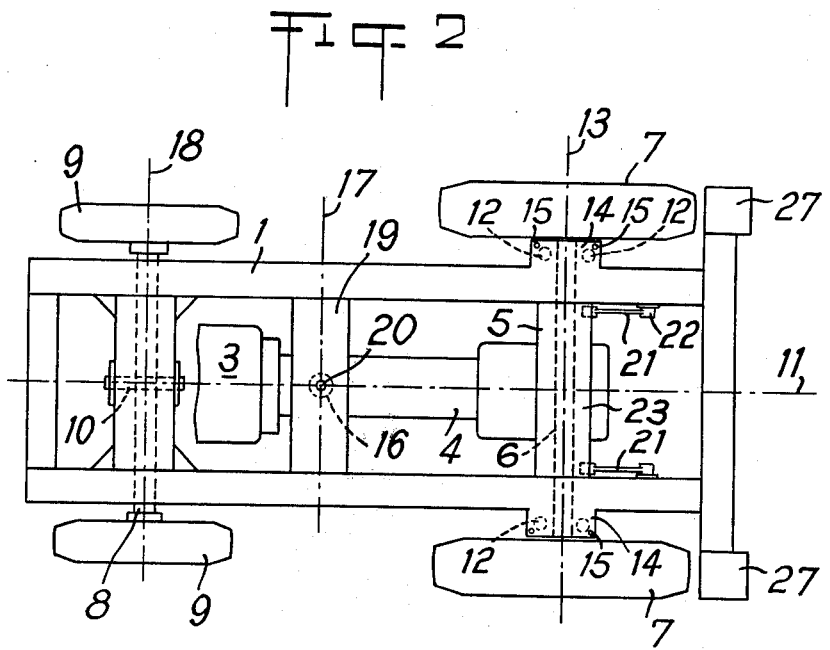

VEHICLE, SIMILAR IN TYPE TO A TRACTOR, COMPRISING A RIGID ASSEMBLY

Self-propelled vehicles are commonplace, particularly "tractor" type machines for civil engineering work, which comprise a rigid assembly grouping together the engine and transmission casing to the driving units.

Furthermore, a conventional tractor of this kind comprises a driver's cab which is often resiliently mounted on the rigid assembly; however, by the very fact that it is designated a tractor, no large piece of plant equipment is fixed to it.

On occasion lifting jacks of agricultural implement type or towing hooks are fixed directly onto the rigid assembly.

It is found that it is impossible to fix the plant equipment directly to the rigid assembly when it is required, for reasons of convenience of application, to make up a machine similar in construction to a tractor, in this instance to produce a machine such as the excavator described below, because the mechanical strength of this rigid assembly is not sufficient to stand the various impacts and vibrations produced by the plant equipment.

An extremely strong chassis could be provided, in itself able to accept the impacts and vibrations created when the plant equipment is in use.

The problem would only be partly solved if such a chassis were just to be fixed firmly to the rigid assembly.

According to the present invention there is provided a vehicle, similar in type to a tractor, comprising a rigid assembly, comprising:
  an engine,
  a driven axle to which driving units are attached,
  a transmission case coupling engine to driven axle,
  a piece of plant equipment, a chassis, completely separate from the rigid assembly to which the plant equipment is secured, the said chassis being able to accept the stresses created by the said plant equipment, and resilient suspension units in the nature of rubber pads and at least one link hinged to the chassis and the rigid assembly connecting the chassis to the rigid assembly operable to absorb impacts and vibrations created by the plant equipment in chassis in transmission to the rigid assembly.

Furthermore, the following arrangements are preferable:
  the link is substantially parallel to the bearing plane of the driving units on the ground;
  the link is attached to the rigid assembly at a point substantially in line with the driven axle in relation to the bearing plane of the driving units on the ground;
  a resilient component is able to function under tension when another is under compression;
  at least one resilient component is located substantially in the plane of the driven axle with respect to the longitudinal centreline of this machine, at least one other resilient component being located between the said driven axle and an additional axle;
  the additional axle consists of a pivotable axle pivoting on the chassis round a pin parallel to the longitudinal centreline of the machine.

The invention will be understood better and the secondary characteristics as well as their advantages will become apparent in the following description of an embodiment given as an example.

Reference will be made to the attached drawings, in which:

FIG. 1 is a vertical cross-section of an embodiment of vehicle according to the invention; and FIG. 2 is a view from above, in line with arrow F in FIG. 1.

The vehicle illustrated is a "tractor" type machine having a chassis 1 at the rear of which a piece of plant equipment 2, suitable for digging, is hinged.

This machine has a power unit 3, in this case comprising a diesel engine, a transmission unit 4 and a rear axle 5, the casings of these units being coupled by known conventional methods, such as bolting for example, to form a rigid drive component assembly, the rear axle drive shaft 6 being connected rotatively to the output shaft of engine 3. The rear wheels 7 are, of course, fast rotatively with drive shaft 6 in the said rear axle.

Front axle 8, which carries front wheels 9, comprises an oscillating axle which pivots on chassis 1 round a pin 10 which is parallel to the engine's longitudinal centreline 11 and which, furthermore, is located in the longitudinal plane of the said machine.

It is to be noted in addition that the chassis is fixed to the monobloc rigid assembly 3-4-5 by the intermediary of resilient components.

The resilient components in the region of rear axle 5, comprise two pairs of rubber pads 12 which are arranged substantially along the transverse plane 13 of the rear axle 5, adjacent wheels 7, and which are fixed to casing 5 of this axle. Brackets 14, integral with chassis 1, rest in their turn on the rubber pads 12 which consequently work mainly in compression due to the sole effect of the weight of the chassis. It will be noticed, however, that brackets 14 are secured to the metal backing plates of pads 12 by bolts 15 which enable the said pads, if necessary, to work also in tension.

Another rubber pad 16 has its metal backing plates secured by means of bolts 20, on the one hand, to cross member 19 which is fast with chassis 1, and, on the other hand, to the assembly 3-4-5 in such a manner that this assembly is suspended from the said cross member through the intermediary of the said pad 16. Cross member 19 is actually located intermediately in a transverse plane 17 between plane 13 and the transverse plane 18 of front axle 8. Note that pad 16 works under tension due to the sole effect of the weight of the rigid assembly 3-4-5, although it is possible for it to work if necessary in compression particularly under the effect of driving torque when the machine is moving forward.

Finally, two links 21 are located one on each side of the vehicle's longitudinal plane which passes through longitudinal centreline 11. The said links are hinged, on the one hand, to chassis 1 round pins 22 each mounted in a bracket on chassis 1 as shown in FIG. 1 and, on the other hand, to rear axle casing 5 round pins 23, preferably in the known conventional method by means of circular rubber bushes. As shown in the layout of FIG. 1, links 21 are arranged substantially in plane 24, which passes through the centre of rear axle 5 and lies parallel to the ground 25.

The advantages which accrue from using a machine of this description will now be seen.

Chassis 1 is completely insulated from the vibration sources consisting of engine 3, transmission case 4 and rear axle 5 by means of rubber pads 12 and 16. Not only does good mechanical filtration of vibrations occur due to this but also filtration of non-vibratory stresses is achieved. Thus the degree of comfort in the driver's cab 26, which is secured to chassis 1, is higher than that obtained in earlier applications.

Furthermore, stresses transmitted by the plant equipment 2 when in operation can only be transmitted to the rigid assembly 3-4-5 via rubber pads 12 and 16 at which level stress absorption takes place. In particular impacts caused by the operation of the plant equipment 2 are filtered and absorbed and there is no risk that the mechanical components in assembly 3-4-5 will suffer damage as a result.

Note also that chassis 1 is often provided with stabilizing legs 27 through which it maintains contact with the ground when plant equipment 2 is in operation. In a layout of this kind no reaction from the ground is transmitted to rear wheels 7 adjacent to which the stabilizing legs 27 are arranged to rest on the ground and this eliminates the transmission of stresses and impacts from rear wheels 7 and rear axle 5 to the assembly 3-4-5. Here again, the proposed machine offers satisfactory working conditions and good protection for the mechanical units from impacts caused by plant equipment 2 when in operation.

Of course, it is understood and it need not be stressed here that links 21 are designed to ensure the transmission of vehicle traction forces existing in chassis 1 between rear wheels 7 and the ground 25 and to enable the said chassis to move in relation to the ground in this way.

The invention is not limited to the application which has been described above; on the contrary, it encompasses all those variations which could be attributed to it without going beyond its scope or its notion.

I claim:

1. A tractor vehicle comprising an engine, a driven axle, driving means attached to said driven axle for engagement with a supporting surface to provide movement of said vehicle, a transmission case coupling said engine to said driven axle, said engine, driven axle and transmission case being coupled together to define a unitary rigid drive component assembly, a separate equipment chassis completely separate from the unitary rigid drive component assembly, a piece of plant equipment mounted on said separate equipment chassis, resilient suspension means providing supporting connection between said unitary rigid drive component assembly and said equipment chassis and link means respectively hinged on opposite ends to said equipment chassis and to said rigid drive component assembly for restraining front to rear movement of said drive component assembly with respect to said equipment chassis, said resilient suspension means comprising compression type resilient members mounted in vertical alignment above said driven axle and below a rear portion of said equipment chassis maintained in compression between said driven axle and said equipment chassis by the weight of said equipment chassis and a tension type resilient member having an upper end attached to said equipment chassis and having a lower end attached to said rigid drive component assembly and extending between said unitary rigid drive component assembly and said separate equipment chassis in tension and in general alignment with the centerline of said vehicle and a second vehicle supporting axle attached to said chassis wherein said tension type resilient member is horizontally spaced between said second axle and said driven axle so that said separate equipment chassis can accept the stresses created by said plant equipment and absorb impacts and vibrations created by the plant equipment so as to lessen the impacts and vibrations conveyed to said unitary rigid drive component assembly.

2. The invention of claim 1 wherein said link means is oriented in a horizontal plane and extends substantially perpendicularly with respect to the axis of said driven axle.

3. The invention of claim 2 wherein said link means is pivotally connected to said unitary rigid drive component assembly at a point in substantial horizontal alignment with said driven axle.

4. The invention of claim 2 additionally including a pivot pin extending parallel to the longitudinal centerline of said machine and wherein said second additional axle comprises a pivotable axle mounted on said pivot pin.

5. The invention of claim 1 additionally including a pivot pin extending parallel to the longitudinal centerline of said machine and wherein said additional axle comprises a pivotable axle mounted on said pivot pin.

6. The invention of claim 5 wherein said tension type resilient unit is connected to said transmission casing portion of said unitary rigid drive component assembly.

* * * * *